United States Patent [19]
Desbos et al.

[11] Patent Number: 5,582,733
[45] Date of Patent: Dec. 10, 1996

[54] METHOD AND INSTALLATION FOR PURIFYING WATER USING VARIABLY AGITATED DENITRIFYING PHYSICAL-CHEMICAL SLUDGE

[75] Inventors: Gilbert Desbos, Maisons Laffitte; Philippe Rey, Chelles; Frank Rogalla, Paris, all of France

[73] Assignee: Omnium de Traitements et de Valorisation, France

[21] Appl. No.: 264,792

[22] Filed: Jun. 23, 1994

[30] Foreign Application Priority Data

Jul. 12, 1993 [FR] France .................... 93 08565

[51] Int. Cl.$^6$ ................................ C02F 3/30
[52] U.S. Cl. .................. 210/605; 210/151; 210/195.1; 210/219; 210/617; 210/622; 210/903
[58] Field of Search ................. 210/150, 151, 210/195.1, 196, 202, 205, 258, 259, 260, 605, 615, 616, 617, 622, 630, 631, 712, 738, 805, 903, 97, 614

[56] References Cited

U.S. PATENT DOCUMENTS

| | | | |
|---|---|---|---|
| 4,282,210 | 8/1981 | Rooney | 210/616 |
| 4,867,883 | 9/1989 | Daigger et al. | 210/903 |
| 5,192,441 | 3/1993 | Sibony et al. | 210/903 |
| 5,296,147 | 3/1994 | Koster et al. | 210/605 |
| 5,304,308 | 4/1994 | Tsumura et al. | 210/903 |
| 5,342,522 | 8/1994 | Marsman et al. | 210/903 |
| 5,393,427 | 2/1995 | Barnard | 210/903 |

FOREIGN PATENT DOCUMENTS

| | | |
|---|---|---|
| 0160527 | 11/1985 | European Pat. Off. . |
| 0522966 | 1/1993 | European Pat. Off. . |
| 2631021 | 11/1989 | France . |
| 8528469 | 2/1986 | Germany . |
| 53-142041 | 12/1978 | Japan .................... 210/903 |

OTHER PUBLICATIONS

Water Research, vol. 13, Apr. 1979, pp. 1009–1015, A. Klapwijk et al.

*Primary Examiner*—Joseph W. Drodge
*Attorney, Agent, or Firm*—Remy J. VanOphem; John VanOphem; Thomas A. Meehan

[57] ABSTRACT

To purify untreated water, for example waste water, containing organic pollution, materials in suspension and nitrogen-containing pollution, reagents are added under conditions adapted to coagulate all of the materials in suspension, including colloidal materials, to form granular physical/chemical floc. Diluting water is added, preferably after the reagents, in a flowrate ratio of at least 2/1. The dilute flocculated water is caused to flow through a bed of sludge in the form of such dense and granular floc and denitrifying bacteria. The bed is subject to turbulent but intermittent agitation. A denitrified effluent is recovered. This denitrified effluent is caused to flow through a biological filter or preferably through a fluidized bed containing nitrifying bacteria and into which oxygen or air is injected. A clarified effluent is obtained, some of which is recycled as the diluting water.

49 Claims, 4 Drawing Sheets

METHOD AND INSTALLATION FOR PURIFYING WATER USING VARIABLY AGITATED DENITRIFYING PHYSICAL-CHEMICAL SLUDGE

BACKGROUND OF THE INVENTION

1. Field of the Invention

The invention concerns the treatment of waste water or drinking water to eliminate therefrom mineral or organic particulate and colloidal materials in suspension and nitrogen-containing and phosphorus-containing pollutants.

2. Description of the Prior Art

There are two normally contradictory water treatment techniques: physical-chemical treatment and biological treatment.

Physical-chemical treatment uses chemical reagents adapted to cause coagulation of colloidal impurity particles by binding them to form floc from which bulky and heavy clumps are then obtained. The coagulant reagents are hydrolyzed and precipitate in the form of discrete particles whose structure depends on the physics/chemistry of the reagents and which have a very high specific surface area, often in the order of 1 000 $m^2/g$. Turbulence induced in the water causes the particles to interact with the organic materials and the materials in suspension to neutralize their surface charge and absorb them to form a microfloc, constituting seed particles from which a future floc (i.e. a future visible clump) is obtained by growth of the microfloc. The water laden with floc is then transferred to a separator reactor from which a clarified effluent and sludge made up of this floc are recovered separately. A particularly high-performance example of such physical/chemical treatment is described in French Patent No. 2,631,021 which describes a method of purifying water with a prolonged coagulation phase enabling, with moderate concentrations of reagents and appropriate agitation, fast elimination of materials in suspension, including colloidal materials. The floc can be fixed or free, depending on whether it is grown on granular supports or in the free state. Separation of the effluent from the sludge can follow on immediately from coagulation/flocculation or be separated from the latter by intermediate stages in which a greater or lesser degree of turbulence is maintained.

The coagulation/flocculation reagents can be of highly varied types including iron salts (such as ferric chloride), aluminum salts (especially chlorides and sulfates) and salts of other metals; they can equally well be polymers.

There are various known methods for determining the quantity and the nature of the reagents to be added to a given water in order to coagulate/flocculate the organic pollution thereof (C, usually defined by the Biological Oxygen Demand BOD, by the Chemical Oxygen Demand COD or even by the Total Organic Carbon TOC) or particulate pollution (Materials In Suspension: MIS). One of these methods is the JAR-TEST. The previously mentioned French Patent No. 2,631,021 describes how to adapt the conditions of the coagulation/flocculation process (with particular reference to agitation) to obtain the required flocculation using the minimum quantities of reagents.

Biological treatments use bacteria (sometimes referred to collectively as "biomass") which can be free bacteria (in "activated sludge" systems) or fixed bacteria (in reactors containing granular supports on which the bacteria are grown and which constitute filters). These bacteria obtain their nourishment from the water to be treated. In practice steps are taken to promote the growth of a particular bacteria population, chosen for its ability to break down a given type of pollution.

Biological treatments are used in particular to eliminate nitrogen-containing pollution from the water to be treated. This pollution is eliminated in two stages, using two different families of bacteria.

Liquid ammonia (in practice the $NH_4^+$ ion) is eliminated by autotrophic nitrifying bacteria. These bacteria must be kept in an aerobic medium, which means that aeration is required. They oxidize the $NH_4^+$ molecule using the injected oxygen to form nitrites ($NO_2$, Nitrosomonas bacteria) and then nitrates ($NO_3$, Nitrobacter bacteria).

The nitrates are eliminated by heterotrophic denitrifying bacteria which, using a carbon-containing substrate and in the absence of free oxygen (the medium must be anoxic), take oxygen from the nitrates, releasing nitrogen in gaseous form.

Maintaining a given bacteria population obviously entails maintaining a certain number of operating parameters (aeration or no aeration, provision of suitable substrates in a form that can be assimilated) and avoiding any phenomena which could have toxic effects on the bacteria, with the risk of a reduction in biological yield or even poisoning of the bacteria. This is why water treatment agencies are disinclined to envisage the injection of reagents in substantial quantities at the entry to a biological reactor.

A known and particularly effective process for the biological purification of nitrogen-containing pollution consists in causing the water to be treated to flow upwards through a denitrification reactor containing denitrifying bacteria in an anoxic medium and then through a nitrification reactor containing nitrifying bacteria in an aerobic medium, a substantial fraction of the effluent leaving the second reactor being recycled by mixing with the effluent to be treated before it enters the first reactor. The denitrifying bacteria therefore degrade the nitrates from the second reactor using the carbon-containing substrate constituted by the carbon-containing pollution in the effluent to be treated. The biological factor limiting the elimination of nitrates in this case is in practice the quantity of carbon present in the effluent to be treated in a form that can be assimilated by the bacteria.

A process of this kind is described in French Patent No. 2,673,618. This patent describes a process for nitrifying and denitrifying polluted water by biological treatment in an aerobic medium and then an anaerobic (or anoxic) medium in which the untreated water, without preliminary settling, is caused to flow upwards through an anoxic first reactor with free biomass in the form of a highly concentrated sludge bed with a high upward flowrate. The effluent from the first reactor is transferred to an aerobic second reactor. Some of the treated water, overflowing from the second reactor, is recycled to the bottom of the first reactor. The total flowrate at the entry to the first reactor (water to be treated plus recycled water) preferably represents an upflow velocity of at least 3 m/h. The flow entering the bottom of the first reactor produces a granular sludge made heavier by the material in suspension in the untreated influent. The concentration of this sludge in the first reactor is preferably between 30 g/l and 100 g/l. Agitation at the bottom of the first reactor improves distribution and enables bubbles of nitrogen to escape. The upper part of the first reactor is advantageously equipped with a lamellar (parallel plate) settling tank. The untreated water has usually been screened and had sand oil removed from it beforehand (but without any primary settling being necessary) and can have reagents added to it adapted to increase the settling rate of the sludge, for example flocculating agents such as alum, ferric chloride or polymers. Lime can also be added to form carbonates and precipitate the phosphorus.

Another denitrification-nitrification process is described in European Patent No. 0,522,966 (TAMBO) which proposes a flocculation stage to form floc laden with phosphorus, a stage of mixing with a recycled fraction of nitrified water, a denitrification stage, a solid separation stage and a nitrification stage at the outlet from which the recycled fraction is taken. Polymer flocculating agents are used, for example, at a concentration of about 0.1 ppm–20 ppm (equivalent to 0.1 mg/l–20 mg/l). Further polymer flocculating agents can be added prior to the denitrification stage.

The idea of a denitrification reactor with no granular material had already been described by A. KLAPWJIC, in particular in "The Application of an upflow reactor in the denitrification step of biological sewage treatment", KLAPWJIC, JOL and DONKER, published in Water Research Vol 13, pp 1009–1015, Pergammon Press Limited 1979. Tests have been carried out with a small reactor (14.7 l) and sludge containing denitrifying bacteria agitated intermittently (10 minute intervals between agitation for 3 seconds at 120 rpm). The water to be treated had been allowed to settle beforehand, the upflow velocity was 0.12 m/h and the mass concentration of the sludge was 30 g/l.

An object of the invention is to eliminate organic and nitrogen-containing (even phosphorus-containing) particulate and colloidal (materials in suspension) pollution, offering purification performance levels exceeding the prior art levels. In particular, it is directed to purification of urban or industrial waste water (and drinking water) in conformance with the E standards (MIS<30 mg/l, COD<90 mg/l, nitrogen-containing pollution in the form $NH_4^+$ and $NO_3^-$<20 mg/l), or even the F standards (MIS<15 mg/l, COD<M 50 mg/l, nitrogen-containing pollution in $NH_4^+$ and $NO_3^-$ form<10 mg/l), and preferably the PT1 standards (phosphorus<2 mg/l) or even the PT2 standards (phosphorus<1 mg/l), using a process that is fast, efficient and economical and which does not require a costly and large-size installation.

To this end the invention teaches combining a specific physical/chemical treatment (thorough coagulation/flocculation) with a specific biological treatment (denitrification with dilution in the nitrified water obtained in a second stage).

It is important to emphasize that water treatment agencies have been reluctant to accept any such combination, for the following reasons:

the short-term and long term effects of physical/chemical reagents on bacteria and on their biological yield is unknown or at best only poorly understood; all the more so in that there may be negative synergistic effects (with attendant risks of toxicity) between reagents and/or breakdown products which do not in isolation have deleterious effects, it is logical to think that the carbon which can be assimilated by the bacteria and which is therefore needed for the denitrification process (in theory this is only part of the BOD which is itself only part of the COD), is mainly in soluble form. It is clear that flocculation tends to reduce the quantity of soluble carbon available in the water, due to adsorption, and therefore tends to prevent the carbon that can be assimilated reaching the bacteria freely. It is therefore logical to fear that physical/chemical coagulation/flocculation treatment could reduce the quantity of carbon available in the water in a form that can be assimilated by the bacteria and therefore at least inhibit to a greater or lesser degree the biological denitrification process. It has therefore seemed unthinkable to envisage physical/chemical treatment pushed to the extent of virtually total elimination of the carbon-containing pollution that could be assimilated immediately before biological treatment employing heterotrophic bacteria using the carbon-containing substrate to break down the nitrates.

SUMMARY OF THE INVENTION

The present invention consists in a process for purifying untreated water containing organic pollution, materials in suspension and nitrogen-containing pollution, in which process:

the untreated water, subject to given agitation conditions, has added to it coagulation/flocculation reagents in a given proportion and diluting water containing nitrates injected at a flowrate ratio of at least 2/1, to produce a dilute flocculated mixture, the dilute flocculated mixture is passed through a denitrification reactor via a bed of sludge containing denitrifying bacteria, subjected to agitation and maintained under anoxic conditions, to flow upwards therein at an upflow velocity sufficient to maintain expansion of the bed of sludge, clarified denitrified effluent overflowing from this reactor, the clarified denitrified effluent is caused to flow upwards in a nitrification reactor maintained under aerobic conditions and containing nitrifying bacteria fixed to a granular material, clarified nitrified effluent overflowing from this reactor, and the water containing nitrates with which the mixture is diluted is removed from the clarified nitrified effluent, wherein:

the given agitation conditions and the given proportion of reagents are chosen such as to coagulate all the materials in suspension, including colloidal materials, contained in the untreated water in the form of dense and granular floc constituting, with the denitrifying bacteria, the bed of sludge, the agitation to which the layer of sludge is subjected in the denitrification reactor is turbulent but intermittent, with stop periods substantially longer than the agitation periods, adapted to shear and degas the bed of sludge.

The invention can be regarded as a coagulation/flocculation/sedimentation process with the following specific features:

to consume the organic pollution of the water to be treated, denitrifying bacteria in the sedimentation area are further nourished with water containing nitrates, the water containing nitrates comes from a nitrification area on the downstream side of the sedimentation area, the flocculated water flows upwards through the sludge, and the sedimentation area is agitated intermittently.

As defined above, the invention is distinguished from French Patent No. 2,673,618 and European Patent No. 0,522,966 by the extent of the coagulation/flocculation process involved and by the intermittent agitation of the denitrifying sludge.

With regard to the first distinguishing feature, it has been mentioned above that although the above mentioned patents disclose the injection of reagents into water intended to pass through a bed of sludge containing denitrifying bacteria, one skilled in the art has been logically obliged to restrict this injection of reagents so as not to unduly reduce the allowable quantity of carbon available to the bacteria in a form they can assimilate; one skilled in the art was logically obliged to consider the quantity of reagents as a compromise between the requirement to increase the weight of the floc and that to maintain sufficient carbon available to the bacteria.

The inventors have surprisingly discovered that this concept of a compromise was illusory and that, going against all expectations, the carbon which can be assimilated by the bacteria is not neutralized by coagulating it and incorporating it into the floc. In other words, the inventors have found that the carbon which can be assimilated by the bacteria (i.e. which is biodegradable) initially contained in the untreated water continues to be available after thorough coagulation/flocculation.

In the present context, thorough coagulation/flocculation means coagulation/flocculation carried out with concentrations of reagents and agitation conditions adapted to eliminate as completely as possible all materials in suspension contained in the influent, including colloidal materials. A typical example of such thorough coagulation/flocculation is the prolonged coagulation process described in the previously mentioned French Patent No. 2,631,021.

This is routine practice in the treatment of surface water: the correct concentration of coagulant is determined by a laboratory test, called the JAR-TEST, carried out with flocculation jars of given capacity (typically 1 l) and given agitation conditions (typically 120 rpm) in which various concentrations of reagents are added to water representative of the water to be treated, in order to identify the concentration yielding the lowest possible turbidity (content of colloids). This thorough coagulation process is not used much in the case of waste water, however (this was one of the novel features of French Patent No. 2,631,021).

It is important to realize that the sludge laden with biomass that the invention uses in the denitrification reactor is special, as compared with the sludge of French Patent No. 2,673,618 and European Patent No. 0,522,966, in the sense of being formed of cross-linked floc which is dense and compact (average size typically less than 3 mm–5 mm), calling for moderate coagulation (typically with low concentrations of reagents, often less than around 20 mg/l with conventional agitation conditions—other than those of the prolonged coagulation of French Patent No. 2,631,021), and produces loose, poorly aggregated and sometimes fibrous floc which is bulky and not very dense and which can release some of the materials in suspension, especially the colloids, if agitation produces high shear stresses.

The dense and compact cross-linked floc advantageously generated by uniformly distributed high turbulence (the teaching of French Patent No. 2,631,021) guarantees, by virtue of its strength and its chemical formation, the absence of any significant release of colloids in the case of fast agitation, so preventing any deterioration of the water leaving the layer of sludge. Such floc can therefore withstand, without releasing colloids, agitation conditions adapted to degas the sludge to evacuate therefrom the bubbles of nitrogen generated by the bacteria breaking down the nitrates.

In other words, one novel feature of the invention stems from the fact that thorough coagulation/flocculation producing dense cross-linked floc leaves the carbon-containing pollution in a form that can be assimilated by the bacteria while resisting the tearing off of colloids by brusque agitation phases needed for degassing. It seems that the adsorption of the colloids is irreversible; it seems that there is a threshold beyond which this irreversibility occurs.

One hypothesis is that it is the quantity of the ferric hydroxide in the floc (essentially otherwise comprising materials in suspension) that causes irreversible adsorption of the finest materials in suspension (colloids), this adsorption being, of course, also dependent on the specific surface area of the floc (small and granular), this parameter being related to the greater or lesser turbulence with which the floc was formed and the sludge kept fine.

Release of colloids would deteriorate the water leaving the denitrification reactor and would be accompanied by significant leakage of heterotrophic bacteria to the nitrification reactor in which their short population doubling time (around 0.5 h) would oppose the growth and the assimilation kinetics of the nitrifying autotrophic bacteria which have a much longer population doubling time (around 20 h).

The concentration of coagulant or flocculating agent naturally depends on the pollution content of the untreated water; in accordance with the invention, in the case of untreated waste water, it is usually in the range from 30 mg/m$^3$ to 100 mg/m$^3$ of $FeCl_3$.

Dense and granular floc in the sense of the invention can be recognized, for example, by virtue of the fact that in the JAR-TEST a sample of such sludge (approximately 1 liter of sludge agitated at 120 rpm) settles out in a time period between a few minutes and about one quarter-hour.

The physical/chemical sludge laden with biomass used in accordance with the invention is therefore fundamentally different from the sludge obtained by limited and partial coagulation/flocculation which does not eliminate colloidal materials in suspension.

As mentioned above, the principle of brusque but intermittent agitation had already been proposed by KALPWJIC; there is no description of the purpose of such agitation, however, but given the numerical values indicated, which yield a very high peripheral speed (1.5 m/s in a 20 cm diameter reactor), it seems impossible for such agitation to bring about degassing without substantial release of colloids and therefore of bacteria and even of floc. Consequently, and given that KLAPWJIC describes only laboratory tests (which are difficult to extrapolate to an industrial scale), with very low upflow speeds (0.12 m/h) and using primary settling (whence the formation of sludge very different from that disclosed in French Patent No. 2,673,618 and European Patent No. 0,522,966, it is hard to see what might have caused the man skilled in the art to consider this mode of agitation in combination with the teachings of French Patent No. 2,673,618 in particular.

In accordance with the present invention, the purpose of the brusque but intermittent agitation is to generate strong, short-range (a few centimeters) turbulence which, applied briefly, shears the floc (obtained by thorough coagulation/flocculation, see above) forming the bed of sludge, preventing the sludge developing, or even breaking up the sludge, without releasing particles (colloids or materials in suspension) able to escape from the layer of sludge and to be entrained out of the denitrification reactor: there is therefore good release of bubbles of nitrogen and stabilization of the floc size. This stabilization is an important aspect in that the invention uses the layer of sludge as a filter (adapted to hold back colloids mechanically and by adsorption); it is therefore beneficial to maintain the performance of this filter constant. Controlling the maximal size of the nitrogen bubbles released, by appropriate choice of the agitation frequency, has the advantage of guaranteeing that the bubbles are released before they are large enough to lift the floc.

It is particularly advantageous if the nitrification reactor is a three-phase fluidized bed (water, fixed biomass and air or oxygen bubbles). This enables use of the invention continuously and within a compact overall size as, compared with the use of the filter, there is no need to wash the filter (and therefore to interrupt normal operation of the installation) or to store a large volume of good quality water specifically for carrying out such washing. The granular material on which the nitrifying bacteria are fixed is fine sand in practice, with a typical mean size between 100 μm and 1 000 μm. The range from 200 μm to 500 μm has been found to yield entirely acceptable fluidized beds. Specific tests have been carried out with a size of around 300 μm. Alternatively, however, the nitrification reactor can be a biological filter.

According to preferred features of the invention, some of which may be combinable with others:

the turbulent but intermittent agitation is made up of intervals of between 0.5 minute and 6 minutes duration between turbulent agitation phases of between 1 second and 10 seconds duration, each agitation phase is obtained by rotating an agitator with sharp edges having peripheral speeds of at least 0.3 meters per second at 1 meter from the rotation axis, the agitation is obtained by intermittent pumping within the layer of sludge, in this case, the pumping is adapted to force internal circulation of the layer of sludge through mechanical obstacles fixed relative to the pumping members, the mechanical obstacles are grids or bars, sludge is extracted from the denitrification reactor so as to maintain a constant biologically active height of the bed of sludge in service, the height of the bed of sludge in service is such that the upper surface of the bed of sludge remains on average at least 0.03 m below the overflow level, sludge is extracted from the bottom part of the denitrification reactor, and/or sludge is extracted from the top part of the active area of expanded sludge of the denitrification reactor, the denitrification reactor includes a separator in its upper part, for example a lamellar (parallel plate) assembly, the dilute mixture is forced through the layer of sludge over a height of at least 1 meter, a separator member is disposed in the bed of sludge so as to separate the layer of sludge into a top sub-layer which is subjected to turbulent but intermittent agitation and a bottom sub-layer which is not agitated, the mixture entering the denitrification reactor between these sub-layers, the given agitation conditions chosen by the coagulation induces homogeneous turbulence in contact areas, the given proportion of reagents is between 30 mg/l and 100 mg/l, the reagents are included in a group containing iron and aluminum salts and synthetic polymers, the diluting water is added after the reagents are added and allowed to act, the ratio of the flowrates of the diluting water and the untreated water is between 2/1 and 8/1.

The invention further proposes, for implementing the method, an installation for purification of untreated water containing organic pollution, materials in suspension and nitrogen-containing pollution, embodying:

a first area having an inlet for untreated water, a reagent inlet, agitator means, a diluting water inlet and an outlet connected to a first pipe, a first reactor containing in its bottom part a bed of sludge containing denitrifying bacteria and having an inlet in the bottom part connected to the first pipe, a sludge agitator, a sludge extraction outlet and containing in its upper part a clarified effluent outlet, a second reactor containing an immersed and aerated granular material laden with nitrifying bacteria and having an inlet connected by a second pipe to the clarified effluent outlet, an oxygen inlet for injecting oxygen, and an outlet in the upper part connected to a treated water removal line, and a recycling line connected between the removal line and the diluting water inlet of the first area, wherein:

the bed of sludge of the first reactor is in the form of dense and granular physical/chemical floc and free denitrifying bacteria, the sludge agitator of the first reactor is operated intermittently with intervals between nonagitation phases substantially longer than the agitation phases.

According to other features of the invention, some of which may be combinable with others:

the second reactor is a three-phase fluidized bed composed of water, fixed nitrifying bacteria and injected oxygen, the granular material carrying the nitrifying bacteria is sand, the nitrifying bacteria is fixed to sand with a mean grain size between 110 μm and 1 000 μm, the mean grain size of the sand is between 200 μm and 500 μm, the mean grain size of the sand is approximately 300 μm, the bed of sludge of the first reactor has a concentration between 3 g/l and 20 g/l, a level controller is provided to maintain the top surface of the bed of sludge of the first reactor substantially constant in service, the level in service of the top surface of the bed of sludge of the first reactor is maintained at least 0.3 m below the clarified water outlet, the inlet of the first reactor is at least 1 meter below the level in service of the top surface of the bed of sludge, the first reactor contains, inside the bed of sludge, a separator member below the agitator and the inlet connected to the first pipe, the intermittent operation of the agitator of the first reactor includes activation of the agitator for between 1 second and 10 seconds and deactivation thereof for between 0.5 minute and 6 minutes, the agitator of the first reactor includes a rotary shaft having mobile parts with sharp edges immersed in service in the bed of sludge, the mobile parts include bars with sharp edges and spaced by a distance between 2 centimeters and 20 centimeters, the spacing being either constant or increasing from the rotation axis towards the periphery, the mobile parts have a peripheral speed of at least 0.3 m/s at 1 meter from the axis, the agitator includes a pumping member immersed in service in the layer of sludge, the agitator includes obstacles which are stationary relative to the pumping member and are disposed in the bed of sludge in such a way as to intercept the agitated sludge, the mechanical obstacles are grids or bars, the diluting water inlet is downstream of the first area, the first area includes a plurality of successive contact chambers each having a water inlet, a water outlet, an agitator and a reagent inlet, each mechanical agitator including thin paddles provided with combs whose teeth have identical REYNOLDS numbers and, the first reactor has a separator in its top part.

Objects, features and advantages of the invention will emerge from the following description given by way of nonlimiting example with reference to the appended drawings.

DETAILED DESCRIPTION OF THE PREFERRED EMBODIMENTS

Figure 1:
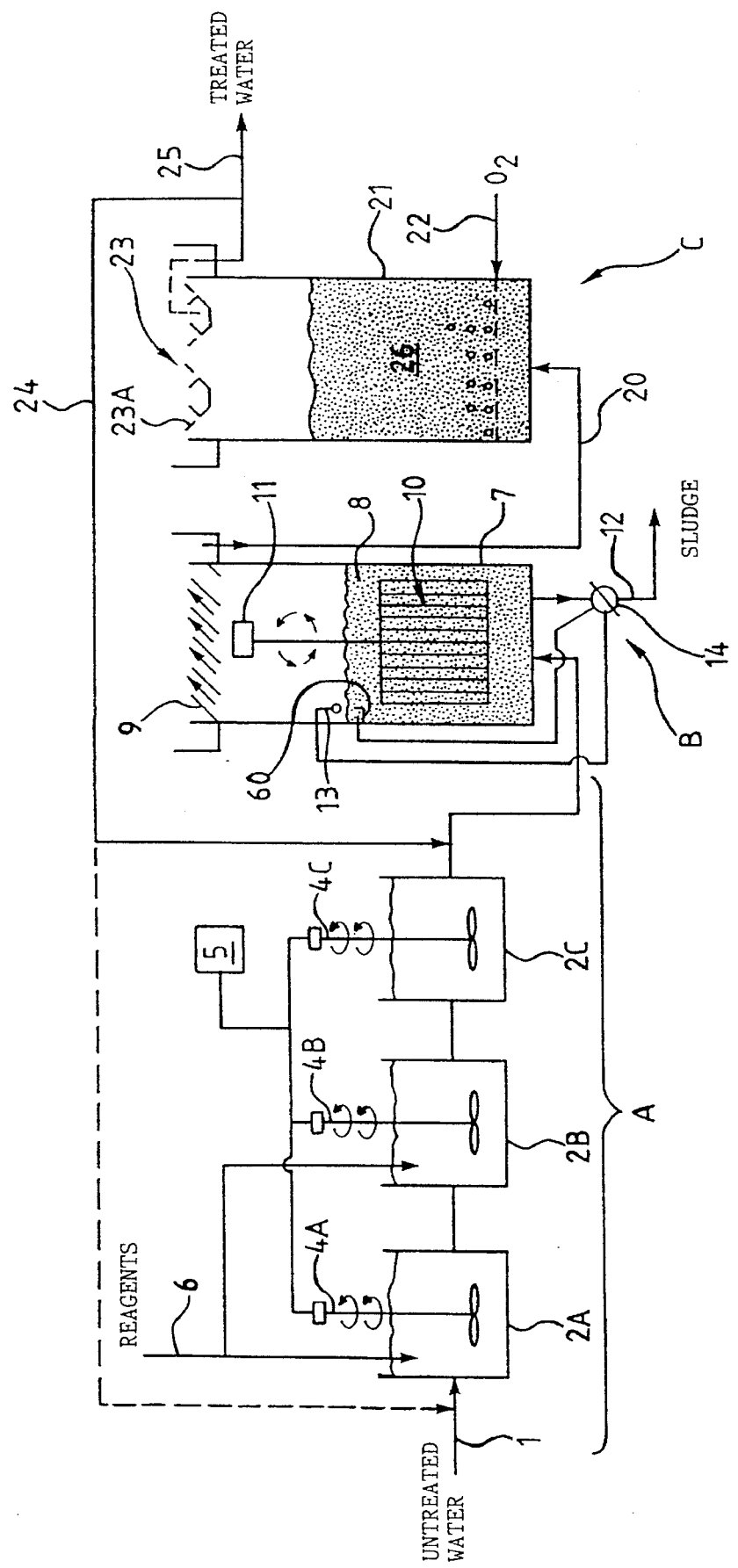
FIG. 1 is a functional block diagram showing the steps in the purification of untreated water in a preferred embodiment of the invention.
Figure 2:
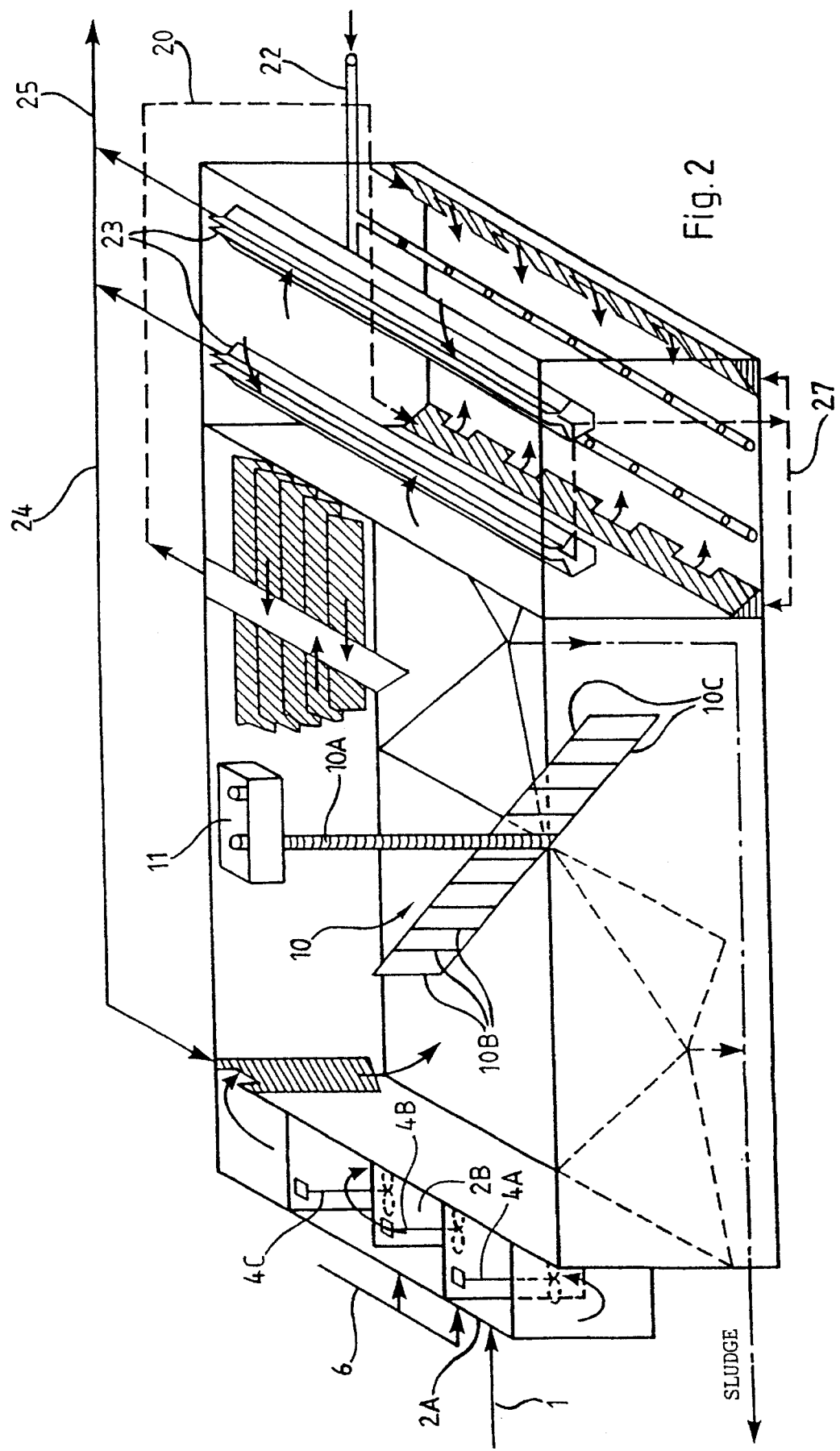
FIG. 2 is a diagrammatic perspective view of a purification installation for implementing the invention.

FIG. 1 is a diagram showing the stages of a purification process according to the invention and FIG. 2 shows one embodiment of an installation for implementing this process.

The process starts with untreated water containing organic pollution, colloids and materials in suspension and nitrogen-containing pollution. This untreated water can have undergone preliminary treatment to eliminate large particles.

This otherwise untreated water then undergoes in succession a coagulation/flocculation/dilution stage A, a denitrification stage B and a nitrification stage C. This produces a flow of treated water some of which is used as the diluting water for stage A.

In the example shown the diluting water is injected at the end of stage A. As an alternative, shown in dashed line, it can be injected at the start of stage A.

The dilution ratio (dilution flowrate/untreated water flowrate) is typically between 2 and 8.

The purpose of coagulation/flocculation is to concentrate within the floc all particulate and colloidal pollution, as an ancillary result of which some of the dissolved pollution is adsorbed into the floc.

The coagulation/flocculation is carried out in accordance with the teaching of French Patent No. 2,631,021, for example. To be more precise, the untreated water fed by a line 1 circulates through a plurality of contact chambers (three chambers 2A, 2B and 2C in this example) into which coagulation/flocculation reagents are injected and in which strong turbulence that is as homogeneous as possible is maintained. As mentioned above, it is preferably after this that the water (laden with floc) is mixed with the diluting water.

The various chambers have agitators 4A, 4B and 4C rotated by a drive system 5.

The reagents are fed into the contact chambers via a distribution line 6. The total dose of coagulant is advantageously injected into the first chamber 2A.

The total dose of reagents to be injected is determined by a JAR-TEST, for example, with the result corrected in accordance with the teachings of French Patent No. 2,631,021.

In theory this total dose is between 30 mg/l and 100 mg/l; in other words, it is significantly greater than the doses disclosed in European Patent No. 0,522,966, for example.

The reagents are in practice chosen from the following group:

iron or aluminum salts, and synthetic polymers.

The agitation conditions are chosen to suit the flowrate of water to be treated, advantageously so as to conform to an average retention time of two minutes in each of the chambers 2A through 2C.

Quantitatively, the turbulence is preferably generated by dissipating in each chamber approximately 0.7 Wh/m$^3$ of water to be treated.

The turbulence is preferably identical in each of the three chambers, and advantageously generated by toothed mobile members in accordance with the teaching of French Patent No. 2,631,021.

Figure 3:
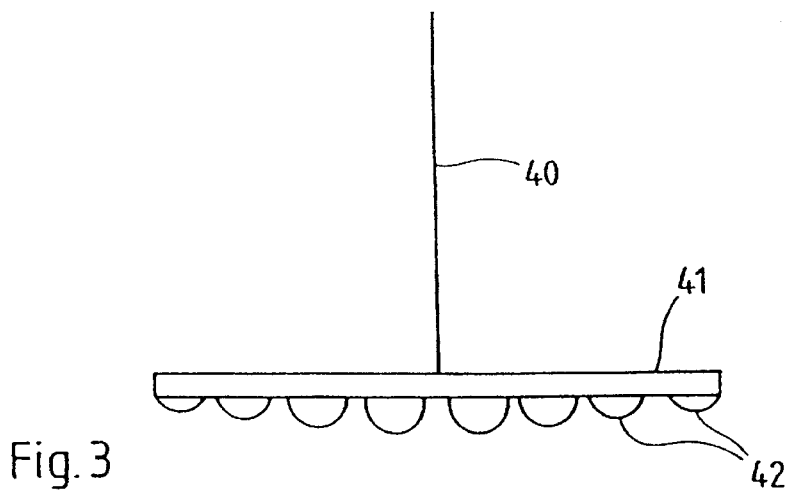
FIG. 3 is a side view of a comb-type agitator suitable for use in the coagulation/flocculation stage.

The agitator of one of the aforementioned chambers, that of the chamber 2A, for example, is shown in FIG. 3. It embodies a shaft 40 rotating a mobile member 41 provided with a comb. To be more precise, the teeth 42 of the comb have equal REYNOLDS numbers. To this end the teeth have dimensions parallel to the shaft which decrease from the center to the periphery of the mobile member.

The diluted mixture obtained at the end of stage A is forced to flow upwards through a reactor 7 which is kept anoxic (no injection of free oxygen) and passes through a layer of sludge 8 containing denitrifying bacteria (typically heterotrophic type bacteria). The reactor 7 advantageously includes a lamellar settling tank 9 at the top. The clarified denitrified water overflows from the reactor 7.

The upflow velocity (typically 3 m/h or greater) is sufficient to maintain the bed of sludge (or at least the part thereof through which the diluted water passes) in a state of expansion.

In the layer of sludge is an agitator member 10 controlled by an intermittent device 11 adapted to generate brusque but intermittent agitation in the layer of sludge 8, so as to shear periodically the floc forming the bed of sludge.

This preferably involves intervals of between 0.5 minute and 5 to 6 minute duration between turbulent agitation phases of between 1 second and 10 seconds duration.

The turbulence is caused by the rotation of a mobile member in the form of a barred gate (vertical bars in this example) with sharp edges.

In this example, with a rotating mechanical agitator, the (intermittent, see above) rotation speed is at least 5 rpm, i.e. a speed of at least 0.30 m/s at a distance of 1 m from the agitator axis.

Figure 4:
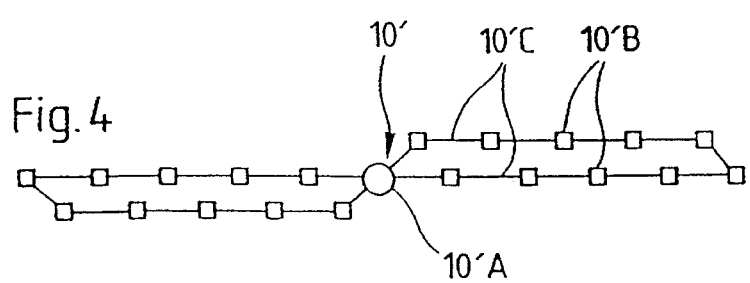
FIG. 4 is a bottom view of an agitator suitable for use in the biological denitrification reactor.

As best shown in FIG. 2 the mechanical agitator member 10 includes vertical bars 10B which are substantially coplanar and fastened to the shaft 10A by horizontal crossbeams 10C. FIG. 4 shows an alternative agitator 10' in which the shaft 10'A carries not one but two rows of vertical bars 10'B in a quincunx arrangement and fastened by horizontal crossbeams 10'C.

The vertical bars have sharp edges, at least in the areas designed to rotate in the sludge, so as to shear the sludge to the maximum, with a low drag coefficient (very restricted wake effect).

FIGS. 5 through 12 show various cross sections for these bars (this selection is not exhaustive), the arrows indicating the direction in which the sludge moves past the bars.

Figure 5:
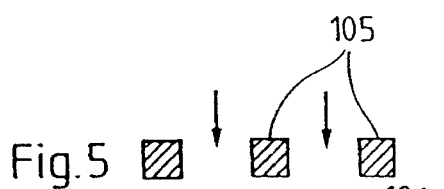
FIGS. 5 through 12 are views in horizontal section of various embodiments of the vertical bars of the FIG. 4 agitator.
Figure 6:
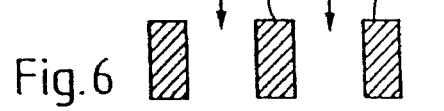
Figure 7:
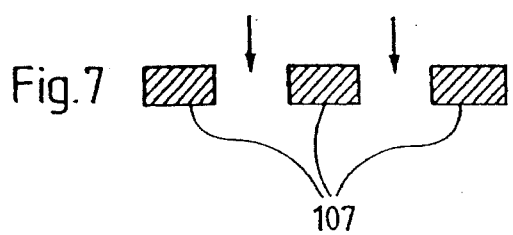
Figure 8:
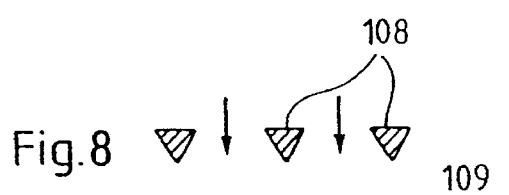
Figure 9:
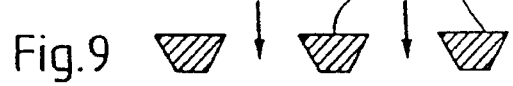
Figure 10:
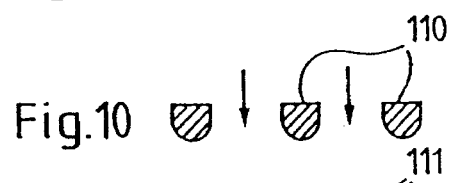
Figure 11:
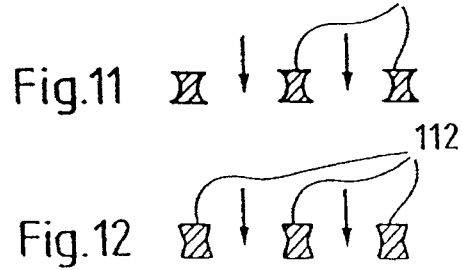
Figure 12:
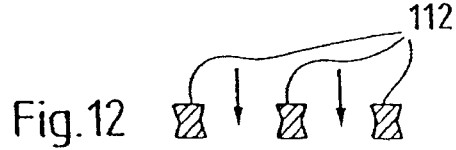

The bars 105 in FIG. 5 have a square cross section; the bars 106 in FIG. 6 have a rectangular cross section elongate parallel to the forced flow of sludge; the bars 107 in FIG. 7 have a transverse rectangular cross section; the bars 108 in FIG. 8 have a triangular cross section with the point to the rear; the bars 109 in FIG. 9 have a trapezoidal cross section with the larger side at the front; the bars 110 have a cross section with a flat side at the front and a rounded side at the rear; the bars 111 have a diabolo-shape cross section with flat sides at the front and at the rear; and the bars 112 in FIG. 12 have a cross section in the shape of two trapeziums joined together on their shorter side.

The spacing of the bars is constant in this example. As an alternative, it can increase from the axis towards the periphery. It is advantageously between 5 cm and 15 cm and the transverse dimension of the bars (perpendicular to the forced flow of sludge) is typically between 0.5 cm and 2 cm, preferably between 10 and 30 times smaller than the distance between the bars.

The bars have an active vertical dimension (i.e. with sharp edges capable of shearing the floc) of between 100 cm and 150 cm in practice. The same goes for the vertical dimension of the mobile members of an agitator with a plurality of mobile members.

If the reactor has a square cross section the total transverse dimension of the mobile members is preferably between 90% and 99% of the side length of this square cross section.

The top surface of the active part of the mobile member of the agitator is preferably between 5 cm and 30 cm below the average level of the layer of sludge in service. The level of the sludge layer obviously varies with the upflow flowrate.

Figure 13:
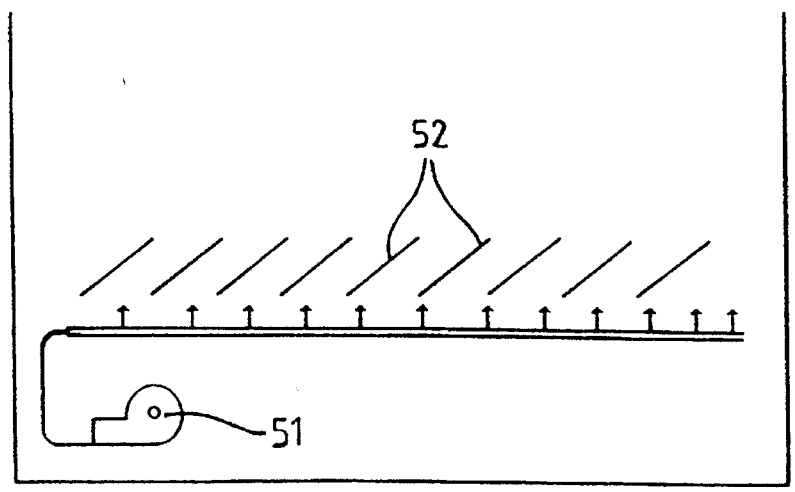
FIG. 13 shows the bottom part of an alternative denitrification reactor having an agitator device operating by internal pumping.

In the embodiment shown in FIG. 13 the intermittent agitation is obtained by pumping sludge inside the bed, so that the sludge is recirculated. The pumping produced by a pump 51 preferably causes the sludge to circulate through members 52 which are fixed relative to the pump, such as bars or vanes disposed in the flow of pumped sludge.

Excess sludge is taken off through a line 12. This extraction is advantageously regulated by means of a level sensor 13 controlling an extractor pump 14, or even a simple purge valve (not shown) operating by gravity and disposed at the bottom of a chute at the bottom of the denitrification reactor.

The level is chosen so that the top surface of the layer of sludge remains on average between 10 cm and 100 cm below the lamellar settling tank 9 (if present). The level is also chosen such that the mixture from stage A travels a distance through the layer of sludge dependent on the quantity of nitrates to be reduced, in practice at least 1 m.

In this example the excess sludge is extracted from the bottom of the reactor (conventionally chute-shaped, in practice, and optionally provided with conventional scrapers).

As shown in FIG. 1, extraction of excess sludge is conventionally obtained by sludge traps 60 in the upper part of the bed of sludge.

Figure 14:
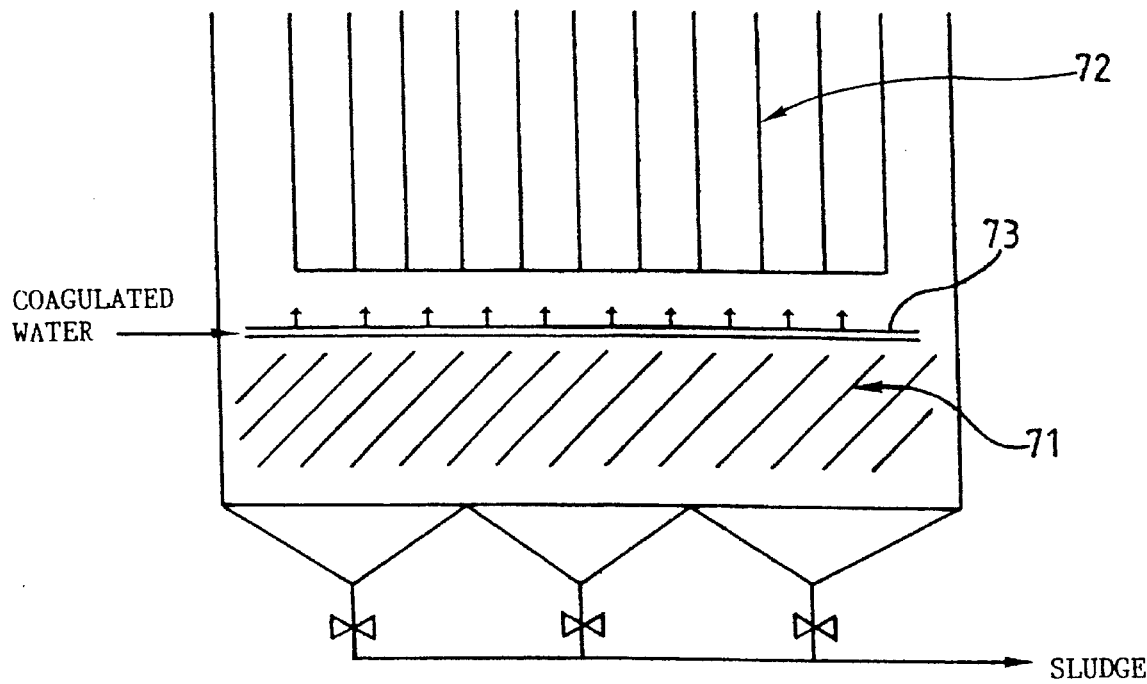
FIG. 14 shows the lower part of a further denitrification reactor including an area for concentration of sludge under the agitator member.

In an embodiment shown in FIG. 14 a separator member 71 such a lamellar settling tank is disposed in the sludge layer and adapted to separate the layer into an upper area which is agitated (by an agitator with bars 72) and a calmer, sludge concentration lower area. The mixture is then fed in just above the separator member, by means of a distribution line 73, for example. The upper area/lower area height ratio is preferably between 0.3 and 3.0.

The average concentration of MIS in the sludge bed is from 2 g/l to 10 g/l and this sludge embodies:

colonies of (living or dead) free bacteria constituting a biomass, physical/chemical floc (hydroxides+mineral materials in suspension).

The clarified effluent leaves the lamellar settling tank 9 (merely a precaution against particles leaving the bed of sludge in service for any temporary reason) at a flowrate equal to the sum of the untreated water and diluting water flowrates, and therefore very much greater than the untreated water flowrate alone.

The clarified effluent is conveyed by a line 20 to the bottom of a second reactor 21 containing nitrifying (in particular Nitrobacter and Nitrosomas) bacteria 26 fixed to a granular support (for example sand). The presence and depolluting activity of the bacteria are promoted by an input of free oxygen, in practice in the form of air or oxygen, via a line 22 in the conventional manner.

At the top of the second reactor 21 is a second separator 23 over which nitrified water overflows, most of this water being fed as diluting water to stage A via a line 24. The remainder, whose flowrate is equal to that of the untreated water, is taken off through a line 25 as treated water.

In this example the second separator 23 is in the known form of channels with convergent upper edges along and at a short distance from which are deflectors 23A whereby the water, on the point of being recovered by overflowing, is calmed to remove any agitation likely to cause entrainment of particles by bubbles of oxygen or air which could degrade the quality of the water or the denitrifying bacteria.

The second reactor does not have any mechanical agitator means.

The second reactor is preferably a three-phase fluidized bed, containing nitrifying bacteria fixed to an aerated and mobile granular material.

The granular material is advantageously sand with a mean grain size between 100 μm and 1 000 μm, preferably between 200 μm and 500 μm; 300 μm grains were chosen for the trials. The advantages of this choice emerge below.

In an alternative embodiment the second reactor is a biological filter containing nitrifying bacteria fixed to an immobile granular material.

In the FIG. 2 example the nitrifying second reactor has an elongate rectangular shape and runs along one side of the first reactor. The clarified water conveyed by the line 20 is injected along two lower longitudinal sides of the second separator 23 which in this example are the reactor. It is recovered at the top by means of troughs 23.

In FIG. 2 the line 27 is a diagrammatic representation of internal recirculation between the outlet troughs 23 and the bottom feed of the nitrifying device, which contributes to expansion of the granular material to which the bacteria is fixed.

For a mean flowrate of 208 $m^3$/h, for example, and untreated water containing on average:

COD: 450 g/$m^3$, of which BOD: 220 g/m³,

MIS: 200 g/m³, nitrogen-containing pollution: 70 g/m³ NTK (Nitrogen Total KJEDAL), the choice can be as follows:

* nature of reagents: FeCl₃,
* proportion of reagents: 50 g/m³,
* recycling rate: 300%,
* volume of chambers 2A to AC: 7 m³,
* denitrification reactor cross section: 180 m²,
* denitrification reactor height: 4.5 m approx,
* dilute flocculated water upflow: 3.5 m/h,
* height of sludge: 1.3 m,
* sludge concentration: 4–6 kg/m³,
* second reactor cross section: 70 m²,
* second reactor height: 4.5 m.

Table 1 shows the results of analysis of the water at the inlet and outlet of the denitrification reactor (phase B, FIG. 1) after, firstly, moderate injection of reagents without specific precautions and, secondly, with greater quantities injected, matched to the agitation conditions indicated above to achieve thorough coagulation.

Table 1 also shows the results of analysis of the water at the exit from nitrification stage C.

The table shows that the physical/chemical treatment proposed by the invention (addition of reagents in quantities and under conditions adapted to achieve thorough coagulation), combined with circulation of the water through a bed of denitrifying sludge (with additional COD consumption for denitrification and with adsorption of colloidal material) produces a water quality at the outlet from the denitrification reactor such that, when recycled, it achieves dilution of the untreated water almost as good as if the dilution were effected using water from the main supply. Accordingly, the quality of the decanted-denitrified water finally entering the nitrification reactor means that the latter can be a fluidized bed requiring no washing or regeneration of the material, whence great simplification of the installation. The biological yield of the fluidized bed is significantly greater than is obtained conventionally in treatment of waste water (approximately 1.5 times that of the reactors usually used to treat waste water).

The invention provides a high capacity as two reactors (decanter-denitrifier and nitrifying three-phase fluidized bed) are sufficient to achieve very high levels of depollution. No ancillary capacity is required, either to store treated water needed for washing as in the case of a nitrification reactor with filter bed and fixed granular material, or for intermediate storage of dirty water resulting from the washing of any such filter.

Obviously the foregoing description is given by way of non-limiting example and numerous variations thereon can be put forward by one skilled in the art without departing from the scope of the invention.

For example, the flocculation can be carried out in the denitrification reactor (separated from the bed of sludge in any appropriate manner), and even in the entry pipes to this reactor. The agitation speeds and the agitation times and intervals can be varied in service.

TABLE 1

| WATER | with conventional flocculation | prolonged coagulation |
|---|---|---|
| entry to phase B | MIS = 100 mg/l<br>COD = 200 mg/l<br>NTK = 28 mg/l<br>NO3 = 10 mg/l | MIS = 60 mg/l<br>COD = 140 mg/l<br>NTK = 17 mg/l<br>NO3 = 10 mg/l |
| exit from phase B | MIS = 70–80 mg/l<br>COD = 120–130 mg/l<br>NTK = 28 mg/l<br>NO3 = 0.0 mg/l | MIS = 8–10 mg/l<br>COD = 40–50 mg/l<br>NTK = 17 mg/l<br>NO3 = 0.0 mg/l |
| exit from phase C (final quality) | MIS = 50–60 mg/l<br>COD = 100–110 mg/l<br>NTK = 15–20 mg/l<br>NO3 = 7–12 mg/l | MIS = 6–8 mg/l<br>COD = 40 mg/l<br>NTK = 2–3 mg/l<br>NO3 = 12–15 mg/l |

There is claimed:

1. A water purifying method using coagulation and/or flocculation reagents for purifying untreated water containing organic pollution, nitrogen containing pollution, and materials in suspension, said method comprising the steps of:

adding said coagulation and/or flocculation reagents to said untreated water;

adding a diluting water to said untreated water to produce a diluted coagulated and/or flocculated mixture, said diluting water injected at a dilution ratio of at least 2/1 and containing nitrates;

passing said diluted coagulated and/or flocculated mixture through a bed of sludge in a provided denitrification reactor containing denitrifying bacteria, said diluted coagulated and/or flocculated mixture being caused to flow upwards through said bed of sludge at a predetermined upflow velocity to maintain an expansion of said bed of sludge;

agitating said bed of sludge at variable agitation rates in said denitrification reactor;

maintaining said bed of sludge under anoxic conditions:

overflowing a clarified, denitrified effluent from said denitrification reactor;

passing said clarified, denitrified effluent through a provided fluidized bed nitrification reactor containing nitrifying bacteria fixed to a bed of granular material by causing said clarified, denitrified effluent to flow upwardly through said bed of granular material having nitrifying bacteria affixed thereto;

overflowing a clarified, nitrified effluent from said nitrification reactor; and recycling a portion of said clarified, nitrified effluent to use as said diluting water.

2. A method according to claim 1 wherein said nitrification reactor comprises a three-phase fluidized bed comprising said clarified, denitrified effluent, said granular material affixed with nitrifying bacteria, and injected oxygen.

3. A method according to claim 1 wherein said granular material affixed with said nitrifying bacteria comprises sand.

4. A method according to claim 3 wherein said sand has a mean grain size between 110 micrometers and 1,000 micrometers.

5. A method according to claim 4 wherein said mean grain size of said sand is approximately 200 micrometers.

6. A method according to claim 4 wherein said mean grain size of said sand is approximately 300 micrometers.

7. A method according to claim 1 wherein said nitrification reactor functions as a biological filter.

8. A method according to claim 1 further comprising the step of extracting sludge from said bed of sludge so as to maintain a constant biologically active height of said bed of sludge.

9. A method according to claim 8 wherein said step of extracting sludge from said bed of sludge further comprises maintaining an upper surface of said bed of sludge on average at least 0.03 meters below the level of overflowing of said clarified, denitrified effluent.

10. A method according to claim 8 wherein said sludge is extracted from a bottom part of said denitrification reactor.

11. A method according to claim 1 further comprising the step of extracting sludge from said bed of sludge in said denitrification reactor by way of a separator in an upper part of said denitrification reactor.

12. A method according to claim 1 wherein said bed of sludge has a height of at least 1 meter.

13. A method according to claim 1 further comprising the step of disposing a separator member in said bed of sludge so as to separate said bed of sludge into a top sub-layer which is subjected to turbulent but intermittent agitation and a bottom sub-layer which is not agitated, said mixture entering said denitrification reactor between said top sub-layer and said bottom sub-layer.

14. A method according to claim 1 wherein said step of agitating said bed of sludge comprises agitating intermittently and inducing homogenous turbulence in a contact area.

15. A method according to claim 1 wherein said step of adding a diluting water is performed at a dilution ratio of between 2/1 and 8/1.

16. A method according to claim 1 wherein in the step of adding said coagulation and/or flocculation reagents are chosen in a proportion to coagulate and/or flocculate said materials in suspension.

17. A method according to claim 16 wherein said step of adding coagulation and/or flocculation reagents includes selecting a proportion of reagents of between 30 milligrams per liter and 100 milligrams per liter of diluted water.

18. A method according to claim 16 wherein said step of adding coagulation and/or flocculation reagents includes selecting said reagents from the group consisting of iron and aluminum salts and synthetic polymers and mixtures thereof.

19. A method according to claim 16 wherein said step of adding a diluting water is completed after said reagents are added to coagulate and/or flocculate said materials in suspension.

20. A method according to claim 1 wherein the step of agitating said bed of sludge in said denitrification reactor comprises agitating said bed of sludge intermittently, having agitation periods shorter than intervals between said agitation periods, said agitation periods adapted to shear and degas said bed of sludge.

21. A method according to claim 20 wherein said intervals between said agitation periods are between 0.5 minutes and 6 minutes and said agitation periods are between 1 second and 10 seconds.

22. A method according to claim 20 wherein said step of agitating said bed of sludge intermittently further comprises rotating an agitator with sharp edges, said agitator extending radially and having a peripheral speed of at least 0.3 meters per second at 1 meter from its axis of rotation.

23. A method according to claim 20 wherein said step of agitating said bed of sludge in said denitrification reactor further comprises intermittently pumping said bed of sludge with a pumping member.

24. A method according to claim 23 wherein said intermittently pumping is adapted to force an internal circulation of said bed of sludge through mechanical obstacles being fixed relative to said pumping member.

25. A method according to claim 24 wherein said mechanical obstacles are grids or bars.

26. A method according to claim 25 wherein sludge is extracted from the top part of said active area of expanded sludge of the denitrification reactor.

27. An apparatus using coagulation and/or flocculation reagents for the purification of untreated water containing organic pollution, nitrogen containing pollution, and materials in suspension, said apparatus comprising:

a first treatment stage having an inlet for introducing untreated water into said apparatus; a reagent inlet for adding said coagulation and/or flocculation reagents to said untreated water; agitator means for agitating said untreated water; means for adding a diluting water; and an outlet;

a first reactor having an upper part, a bottom part, an inlet attached to said bottom part and connected to said outlet of said first treatment stage; sludge agitator means; a sludge extraction outlet; and a first clarified effluent outlet connected to said upper part, said bottom part holding a bed of sludge containing denitrifying bacteria, said bed of sludge containing diluted, coagulated and/or flocculated water flowing upwardly through said bed of sludge, said sludge agitator means operable for agitating said bed of sludge intermittently and at variable agitation rates;

a second reactor containing an immersed and aerated granular material laden with nitrifying bacteria, said second reactor having an inlet connected to said first clarified effluent outlet, an oxygen inlet for injecting oxygen, and a treated water removal line for providing treated water from said apparatus; and a recycling line connected between said treated water removal line and said diluting water means.

28. An apparatus according to claim 27 wherein said second reactor comprises a three-phase fluidized bed comprising clarified, denitrified effluent, said granular material laden with nitrifying bacteria, and injected oxygen.

29. An apparatus according to claim 27 wherein said granular material laden with said nitrifying bacteria comprises sand.

30. An apparatus according to claim 29 wherein said sand has a mean grain size between 110 micrometers and 1,000 micrometers.

31. An apparatus according to claim 29 wherein said sand has a mean grain size between 200 micrometers and 500 micrometers.

32. An apparatus according to claim 29 wherein said sand has a mean grain size of approximately 300 micrometers.

33. An apparatus according to claim 27 wherein said bed of sludge of said first reactor has a concentration between 2 grams of MIS per liter of sludge and 20 grams of MIS per liter of sludge.

34. An apparatus according to claim 27 wherein said second reactor is operable as a biological filter.

35. An apparatus according to claim 27 further comprising level controlling means for maintaining a top surface of said bed of sludge substantially constant.

36. An apparatus according to claim 35 wherein said top surface of said bed of sludge is maintained at least 0.3 meters below said first clarified effluent outlet.

37. An apparatus according to claim 35 wherein said inlet of said first reactor is at least 1 meter below said top surface of said bed of sludge.

38. An apparatus according to claim 27 wherein said first reactor further comprises a separator member located below said sludge agitator means and within said bed of sludge.

39. An apparatus according to claim 27 wherein said intermittent operation of said sludge agitator means comprises activation of said agitator means for periods of between 1 second and 10 seconds and deactivation thereof for periods of between 0.5 minutes and 6 minutes.

40. An apparatus according to claim 39 wherein said sludge agitator means further comprises a rotary shaft having mobile parts with sharp edges immersed in said bed of sludge.

41. An apparatus according to claim 40 wherein said mobile parts include bars with sharp edges, each of said bars being spaced apart by a distance of between 2 centimeters and 20 centimeters, said distances being either constant or increasing from said rotary shaft towards said sharp edges.

42. An apparatus according to claim 40 wherein said mobile parts extend radially from said rotary shaft and have a peripheral speed of at least 0.3 meters per second at 1 meter from said rotary shaft.

43. An apparatus according to claim 27 wherein said sludge agitator means includes a pumping member immersed in said bed of sludge.

44. An apparatus according to claim 43 wherein said sludge agitator means further comprises obstacles which are stationary relative to said pumping member, said obstacles being disposed in said bed of sludge so as to intercept said sludge.

45. An apparatus according to claim 44 wherein said obstacles are grids.

46. An apparatus according to claim 44 wherein said obstacles are bars.

47. An apparatus according to claim 27 wherein said means for adding diluting water is mounted downstream of said reagent inlet.

48. An apparatus according to claim 27 wherein said first treatment stage includes a plurality of successive contact chambers each having a water inlet, a water outlet, an agitator and a reagent inlet, each agitator having thin paddles provided with combs having teeth configured to induce identical Reynolds numbers into water flowing through said chambers.

49. An apparatus according to claim 27 wherein said first reactor further comprises a separator connected to said upper part.

* * * * *

UNITED STATES PATENT AND TRADEMARK OFFICE
CERTIFICATE OF CORRECTION

PATENT NO. : 5,582,733
DATED : December 10, 1996
INVENTOR(S) : Desbos et al.

It is certified that error appears in the above-identified patent and that said Letters Patent is hereby corrected as shown below:

Cover Page, item [54], after "Sludge" insert ---- Bed ----.

Column 1, line 4, after "Sludge" insert ---- Bed ---- .

Column 6, line 46, delete "the man" and insert ---- one ----.

Column 12, line 2, after "such" insert ---- as ----.

Column 12, lines 56 and 57 delete "second separator 23 which in this example are the reactor." and insert ---- reactor. ----.

Column 12, line 58, after "of" insert ----the second separator 23 which in this example are ----.

Signed and Sealed this

Tenth Day of March, 1998

*Attest:*

*Attesting Officer*

BRUCE LEHMAN

*Commissioner of Patents and Trademarks*